United States Patent
Kinoshita et al.

(10) Patent No.: US 6,433,114 B1
(45) Date of Patent: Aug. 13, 2002

(54) METHOD OF PRODUCING POLYETHERESTER MONOMER AND CEMENT DISPERSANTS

(75) Inventors: Mitsuo Kinoshita; Tetsuaki Sugita, both of Aichi (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 09/886,339

(22) Filed: Jun. 19, 2001

(30) Foreign Application Priority Data

Mar. 8, 2001 (JP) ........................................ 2001-064494

(51) Int. Cl.⁷ .............................................. C08F 230/04

(52) U.S. Cl. ..................... 526/240; 528/271; 526/317.1; 526/332.2; 524/745; 524/770

(58) Field of Search .......................... 528/271; 526/240, 526/317.1, 332.2; 524/745, 770

(56) References Cited

U.S. PATENT DOCUMENTS 4,962,173 A * 10/1990 Kinoshita et al. ........... 525/478
5,362,829 A * 11/1994 Kinoshita et al. .............. 524/5

* cited by examiner

*Primary Examiner*—Samuel A. Acquah
(74) *Attorney, Agent, or Firm*—Beyer Weaver & Thomas LLP

(57) ABSTRACT

Polyetherester monomers of a high quality are produced by causing an esterification reaction of polyalkyleneglycol with a closed end of a specified kind which has been refined so as to contain residual free acid by less than 0.03 weight %, as converted to acetic acid, and unsaturated carboxylic acid of another specified kind by using a specified amount of an acid catalyst under a heated and reduced-pressure condition in the absence of solvents and in the presence of p-benzoquinone and/or phenothiazine while distilling away generated water. Cement dispersants are produced by using water-soluble vinyl copolymers obtained by a radical copolymerization reaction between such polyetherester monomers and vinyl monomers.

26 Claims, No Drawings

METHOD OF PRODUCING POLYETHERESTER MONOMER AND CEMENT DISPERSANTS

BACKGROUND OF THE INVENTION

This invention relates to a method of producing polyetherester monomer and cement dispersion agents (or cement dispersants). It has been known to produce polyetherester monomer as an intermediate product by an esterification reaction of polyalkyleneglycol with a closed end and unsaturated carboxylic acid and to copolymerize this polyetherester monomer with vinyl monomers which are copolymerizable therewith to obtain vinyl copolymers that can be used widely as a dispersant, an antistatic agent, an antifogging agent, an emulsifier or an adherent. In such applications, the quality of the monomer to be used in such a copolymerization reaction, and in particular the quality of polyetherester monomer, is known to significantly affect the quality of the produced vinyl copolymer serving as a dispersant, an antistatic agent, an antifogging agent, an emulsifier or an adherent. In other words, if the quality of polyetherester monomer obtained as the intermediate product is not sufficiently high, vinyl copolymers produced therefrom cannot function satisfactorily as a dispersant, an antistatic agent, an antifogging agent, an emulsifier or an adherent.

U.S. Pat. Nos. 4,962,173 and 5,362,829, for example, disclosed water-soluble vinyl copolymers having polyalkyleneglycol chain as a side chain serving as cement dispersants capable of providing a superior fluidity characteristic with a small slump loss to hydraulic cement compositions such as mortar and concrete. Such a water-soluble vinyl copolymer is usually produced by first preparing polyetherester monomer as an intermediate product by an esterification reaction of polyalkyleneglycol with a closed end and unsaturated carboxylic acid and then copolymerizing it with vinyl monomers capable of copolymerizing therewith. In this case, the quality as a cement dispersant of the water-soluble vinyl copolymer which is obtained is significantly dependent on the quality of the monomer, and in particular that of polyetherester monomer, that is used in the copolymerization reaction. In other words, if the polyetherester monomer serving as an intermediate product is of a poor quality, fluidity cannot be provided to a satisfactory manner to a hydraulic cement composition when the water-soluble vinyl copolymer obtained therefrom is used as a cement dispersant. The lowering with time of the fluidity which has been provided (slump loss) is large in such a case, and products obtained by hardening such a hydraulic cement composition have a low compressive strength.

As disclosed in Japanese Patent Publications Tokkai 11-71151, 2000-159882, 2000-159883 and 2000-212273, such polyetherester monomers as described above have conventionally been produced by using an organic solvent with a low boiling point such as benzene in an esterification reaction of polyalkyleneglycol with a closed end and unsaturated carboxylic acid. Use of such an organic solvent with a low boiling point is advantageous in that it is possible to obtain polyetheresters of a fairly high quality. On the other hand, the solvent which has been used for the reaction must be collected and the cost of equipment therefor adds to the total production cost of the polyetherester, or that of the vinyl copolymer to be used as the intermediate product and that of the water-soluble vinyl copolymers serving as a cement dispersant. In addition, the workers will be forced to work in an undesirable environment due to some of the properties of these substances.

SUMMARY OF THE INVENTION

It is therefore an object of this invention to provide a method of producing polyetherester monomer of a high quality without using a solvent.

It is another object of this invention to provide water-soluble vinyl copolymers capable of serving as a cement dispersant with improved properties, obtainable from such polyetherester monomer.

The present inventors discovered, as a result of work in view of the above objects, firstly that it is essentially important to use polyalkyleneglycol with a closed end of a high quality must be used as a starting material in order to obtain polyetherester monomers of a high quality. Polyalkyleneglycol with a closed end obtained by ring-opening addition reaction of alkylene oxide to a corresponding monohydroxy compound is usually used as the starting material and although such polyalkyleneglycol with a closed end obtained by a ring-opening addition reaction is produced industrially by a mass production process and stored until it comes to be used, that is, until polyetherester monomers are to be produced by an esterification reaction with unsaturated carboxylic acid, the present inventors also discovered that free acids which are mostly lower carboxylic acids such as formic acid, acetic acid and propionic acid are generated as by-products and remain, depending on the conditions of the ring-opening addition reaction and the refinement after the reaction. Similar free acids are generated and remain, depending in particular on the conditions at the time of the storage, and polyetherester monomers of a high quality cannot be produced from such polyalkyleneglycol with a closed end if the concentration of the residual free acids exceeds a certain minimum value.

As a result of further investigations, it was discovered that polyetherester monomers of a high quality can be obtained by an esterification reaction between polyalkyleneglycol which h as been refined such that the concentration of residual free acids (converted to acetic acid) is less than a specified value and unsaturated carboxylic acid under a specified condition in the absence of any solvent and presence of a specified amount of p-benzoquinone and/or phenothiazine. The present inventors also discovered that water-soluble vinyl copolymers obtained by a radical copolymerization reaction of such polyetherester monomers of a high quality with vinyl monomers which are copolymerizable therewith inside a water solution can be used as a cement dispersant with superior quality.

DETAILED DESCRIPTION OF THE INVENTION

This invention relates, on one hand, to a method of producing polyetherester monomer, shown by Formula 3 given below, through an esterification reaction of polyalkyleneglycol with a closed end, shown by Formula 1 given below, with the concentration of residual free acid (converted to acetic acid) less than 0.03 weight % and unsaturated carboxylic acid, shown by Formula 2 given below, in the absence of any solvent and under a heated and reduced-pressure condition in the presence of p-benzoquinone and/or phenothiazine in an amount corresponding to 0.03–0.5 weight % of the polyalkyleneglycol with a closed end, by using an acid catalyst and distilling away generated water:

$$R^1\text{—O—A—OH} \qquad \text{(Formula 1)}$$

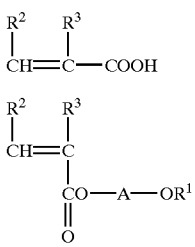

(Formula 2)

(Formula 3)

where $R^1$ is alkyl group with 1–22 carbon atoms, benzyl group, phenyl group or alkylphenyl group having alkyl group with 1–12 carbon atoms, $R^2$ and $R^3$ are each H or methyl group, and A is residual group obtained by removing all hydroxyl groups from polyalkyleneglycol of which the repetition number of oxyalkylene units (consisting either only of oxyethylene units or of both oxyethylene units and oxypropylene units) is 5–250. This invention relates, on the other hand, to cement dispersants characterized as comprising water-soluble vinyl copolymer obtained by a radical copolymerization reaction of polyetherester monomer produced by a method described above and vinyl monomers that can be copolymerized therewith.

Next, a method of producing polyetherester monomers of this invention will be explained. According to this invention, use is made of polyalkyleneglycol with a closed end shown by Formula 1 which has been refined such that the concentration of residual free acid (converted to acetic acid concentration) is less than 0.03 weight %, preferably less than 0.015 weight % and even more preferably less than 0.01 weight %. As explained above, polyalkyleneglycol with closed end is obtained by a ring-opening addition reaction of alkylene oxide with corresponding monohydroxy compound but lower carboxylic acids such as formic acid, acetic acid and propionic acid are produced as residual acid and remain in polyalkyleneglycol with a closed end thus obtained as a reaction product of ring-opening addition reaction, depending on the conditions at the time of the ring-opening addition reaction and the conditions of refinement after the ring-opening addition reaction. In particular, similar residual acids are generated as by-products, depending on the conditions under which it is stored. If the concentration of the residual free acids (converted to acetic acid) exceeds 0.03 weight %, polyetherester monomers with a high quality cannot be obtained by an esterification reaction of such polyalkyleneglycol with a closed end with unsaturated carboxylic acid shown by Formula 2. According to this invention, therefore, use is made of polyalkyleneglycol with a closed end refined such that the concentration of residual free acid (converted to acetic acid) is less than 0.03 weight %, preferably less than 0.015 weight % and more preferably less than 0.01 weight % for an esterification reaction with unsaturated carboxylic acid shown by Formula 2. Throughout herein, the concentration of residual free acid converted to acetic acid means the measured value measured by the method according to JIS(Japanese Industrial Standard)-K1503.

Examples of the method of refinement for removing residual free acids include (1) method by using an adsorbent, (2) methods by neutralization, and (3) method by salting off and dehydration after neutralization. Among these, the methods by using an adsorbent are preferred. Many kinds of such adsorbents may be mentioned but it is preferable to use an adsorbent containing aluminum oxide and/or magnesium oxide such as aluminum oxide-containing agents, magnesium oxide-containing agents, aluminum oxide-magnesium oxide-containing agents, silicate-aluminum oxide-containing agents and silicate-magnesium oxide-containing agents. There are also different kinds of methods for using such agents for a refining process. Preferable among them is a method of mixing polyalkyleneglycol with a closed end containing more than 0.03 weight % (converted to acetic acid) of residual free acid with an adsorbent under a heated condition at about 100° C. and thereafter filtering away the mixture by applying pressure to obtain refined polyalkyleneglycol with a closed end as a filtered liquid with less than 0.03 weight % (converted to acetic acid) of residual free acid.

Regarding polyalkyleneglycol with a closed end shown by Formula 1 thus refined, examples of $R^1$ include (1) alkyl groups with 1–22 carbon atoms such as methyl group, ethyl group, propyl group, isopropyl group, butyl group, hexyl group, octyl group, decyl group, dodecyl group, tetradecyl group, hexadecyl group, octadecyl group, eicosanyl group and docosanyl group; (2) benzyl group; (3) phenyl group; and (4) alkylphenyl groups having alkyl group with 1–12 carbon atoms such as methylphenyl group, ethylphenyl group, propylphenyl group, isopropylphenyl group, butylphenyl group, hexylphenyl group, octylphenyl group, nonylphenyl group and dodecylphenyl group. Among these, however, alkyl groups with 1–12 carbon atoms and benzyl group are preferable and alkyl groups with 1–3 carbon atoms are even more preferable.

As for A in Formulas 1 and 3, examples thereof include (1) residual groups obtained by removing all hydroxyl groups from polyethyleneglycol of which the oxyalkylene units are all oxyethylene units and (2) residual groups obtained by removing all hydroxyl groups from polyethylene-polypropyleneglycol of which the oxyalkylene units include both oxyethylene units and oxypropylene units. Among these examples, residual groups obtained by removing all hydroxyl groups from polyethyleneglycol are preferred.

If residual groups obtained by removing all hydroxyl groups from polyethylene-polypropyleneglycol are used as A, the repetition of its oxyethylene and oxypropylene units may be by random and/or block connections. The repetition number of the oxyalkylene units in the residual group representing A is 5–250, and is preferably 7–90.

Examples of polyalkyleneglycol with a closed end shown by Formula 1 include methoxy polyethyleneglycol, methoxy polyethyleneglycol-polypropyleneglycol, ethoxy polyethyleneglycol, ethoxy polyethyleneglycol-polypropyleneglycol, propoxy polyethyleneglycol, propoxy polyethyleneglycol-polypropyleneglycol, butoxy polyethyleneglycol, lauryloxy polyethyleneglycol, butoxy polyethyleneglycol-polypropyleneglycol, benzyloxy polyethyleneglycol, benzyloxy polyethyleneglycol-polypropyleneglycol, phenoxy polyethyleneglycol, phenoxy polyethyleneglycol-polypropyleneglycol, alkylphenoxy polyethyleneglycol, and alkylphenoxy polyethyleneglycol-polypropyleneglycol.

Examples of unsaturated carboxylic acid shown by Formula 2 include methacrylic acid, acrylic acid and crotonic acid. Among these, methacrylic acid is preferred.

According to this invention, polyetherester monomer shown by Formula 3 is obtained by causing polyalkyleneglycol with a closed end shown by Formula 1 which has been refined such that the concentration of residual free acid (converted to acetic acid) is less than 0.03 weight % and unsaturated carboxylic acid shown by Formula 2 as explained above to undergo an esterification reaction by using an acid catalyst under a heated and reduced-pressure condition in the absence of solvents and in the presence of p-benzoquinone and/or phenothiazine while distilling away generated water. The amount of p-benzoquinone and/or phenothiazine to be present in this reacting system should be 0.03–0.5 weight %, and preferably 0.1–0.25 weight %, of polyalkyleneglycol with a closed end shown by Formula 1. In particular, the presence of p-benzoquinone in an amount of 0.1–0.25 weight % of polyalkyleneglycol with a closed end shown by Formula 1 is preferable. If the amount of p-benzoquinone and/or phenothiazine present in the reacting system is less than 0.03 weight % of polyalkyleneglycol with a closed end shown by Formula 1, there is not sufficient effect on prevention of polymerization. If it is greater than 0.5 weight %, on the other hand, the effect is sufficiently strong but the radical copolymerization reaction does not proceed smoothly when the polyetherester monomer thus obtained is used as an intermediate product to produce vinyl copolymers.

The heating at the time of the aforementioned esterification reaction should preferably be to the temperature range of 105–135° C. and the pressure in the range of 15–0.5 kPa. The heating and the lowering of the pressure should preferably be carried out either continuously or in a stepwise manner within the ranges given above.

Examples of the acid catalyst to be used in the esterification reaction include sulfiric acid, p-toluene sulfonic acid, phosphoric acid and methane sulfonic acid. They may be used either singly or as a mixture but it is preferable to use sulfiric acid singly or a mixed acid of sulfuric acid and p-toluene sulfonic acid. The amount of the acid catalyst to be used is preferably 0.2–1.5 weight % of the total of polyalkyleneglycol with a closed end shown by Formula 1 and unsaturated carboxylic acid shown by Formula 2.

The ratio between the amounts of polyalkyleneglycol with a closed end shown by Formula 1 and unsaturated carboxylic acid shown by Formula 2 to be used in the esterification reaction should preferably be 1/1.5–1/7 (in molar ratio). After the esterification reaction, the excess portion of unsaturated carboxylic acid is distilled away.

The method of producing polyetherester monomer according to this invention is explained next further in detail. When methoxy polyethyleneglycol methacrylate, for example, is produced as the polyetherester monomer of this invention, methoxy polyethyleneglycol and an excess amount of methacrylic acid are placed inside a reactor and a specified amount of p-benzoquinone and/or phenothiazine serving as a polymerization inhibitor, appropriate for the amount of the methoxy polyethyleneglycol which has been refined such that the concentration of residual free acid (converted to acetic acid) is less than 0.03 weight % and a specified amount of concentrated sulfuric acid serving as an acid catalyst are added into the reactor. Next, the temperature of the reacting system is gradually raised and its pressure is gradually lowered until a specified temperature-pressure condition is reached. An esterification reaction is carried out under this temperature-pressure condition while water which is generated is removed by azeotropic distillation of water and methacrylic acid. After the esterification reaction, the excess portion of methacrylic acid is removed to obtain methoxy polyethyleneglycol methacrylate. The polyetherester monomer thus obtained contains the aforementioned polymerization inhibitor and acid catalyst but it may be directly used as an intermediate product for the production of vinyl copolymers without refining to remove them.

Next, cement dispersants according to this invention will be described. The cement dispersants of this invention are characterized as comprising water-soluble vinyl copolymers obtained by a radical copolymerization reaction between polyetherester monomers obtained as explained above and vinyl monomers which are copolymerizable with them in an aqueous solution. Examples of such vinyl monomer include ethylenic unsaturated monocarboxylic acids and/or their salts, ethylenic unsaturated dicarboxylic acids and/or their salts, ethylenic unsaturated monocarboxylic acid esters, unsaturated carboxylic acid esters with hydroxyl group, aromatic vinyl monomers, vinyl monomers with amino group, vinyl monomers with amide group, vinyl monomers with aldehyde group, vinyl monomers with nitrile group, vinyl esters, alkene compounds, dien compounds and vinyl monomers having sulfonic acid group. Among these, ethylenic unsaturated monocarboxylic acids and/or their salts and vinyl monomers with sulfonic acid group are desirable. Particularly preferable are (1) (meth)acrylic acids and/or their salts such as (meth)acrylic acid, alkali metal salts of (meth)acrylic acid, alkali earth metal salts of (meth)acrylic acid and organic amine salts of (meth)acrylic acid, and (2) methallyl sulfonic acid salts to be used with such (meth)acrylic acids and/or their salts such as alkali metal salts of methallyl sulfonic acid, alkali earth metal salts of methallyl sulfonic acid and organic amine salts of methallyl sulfonic acid.

The invention does not impose any particular limitation on the copolymerization ratios of polyetherester monomer and vinyl monomers which are copolymerizable therewith but in the case of radical copolymerization of polyetherester monomer and (meth)acrylic acid and/or its salt, it is preferable to copolymerize 5–50 molar % of polyetherester monomer with 50–95 molar % of (meth)acrylic acid and/or its salt (such that the total will be 100 molar %), while in the case of radical copolymerization of polyetherester monomer, (meth)acrylic acid and/or its salt and methallyl sulfonic acid salt, it is preferable to copolymerize 5–45 molar % of polyetherester monomer, 50–90 molar % of (meth)acrylic acid and/or its salt and 0.3–15 molar % of methallyl sulfonic acid salt (such that the total will be 100 molar %).

The radical copolymerization reaction itself can be carried out in a known manner such as described, for example, in Japanese Patent Publication Tokkai 8-290948. Water-soluble vinyl copolymer can be obtained, for example, by preparing an aqueous solution containing polyetherester monomer obtained as described above, vinyl monomers which are copolymerizable therewith and a chain transfer agent and causing a radical copolymerization reaction for 4–8 hours at reaction temperature of 50–90° C. in a nitrogen environment by adding a radical initiator. Examples of chain transfer agent which may be used in this process include 2-mercaptoethanol, mercaptopropionic acid and mercaptoacetic acid. Examples of radical initiator include persulfates such as sodium persulfate, potassium persulfate and ammonium persulfate and water-soluble radical initiators such as 2,2'-azobis(2-amidinopropane) dihydrochloride.

The average numerical molecular weight (hereinafter Pullulan converted by GPC method) of the water-soluble vinyl copolymers thus obtained by radical copolymerization is preferably 3500–70000 and more preferably 5000–40000.

Cement dispersants embodying this invention which comprises the water-soluble vinyl copolymers may be used for many kinds of hydraulic cement compositions using not only cement but also a mixing material in a fine powder form as a binder, or mortar and concrete as typical examples. Examples of cement include different kinds of portland cement such as normal portland cement, high early portland cement and moderate heat portland cement, as well as many different kinds of blended cement such as portland blast-furnace slag cement, fly ash cement and silica pozzolan cement. Examples of mixing material in a fine powder form include lime stone powder, calcium carbonate, silica fume, blast-furnace slag powder and fly ash.

The rate at which the cement dispersants of this invention should be used is normally 0.01–2.5 weight parts and preferably 0.05–1.5 weight parts % (by solid component) for 100 weight parts cement or a combination consisting of cement and a powder material for mixing. Cement dispersants according to this invention are usually used by adding together with kneading water when hydraulic cement composition is to be prepared.

The method of producing polyetherester monomer embodying this invention is characterized in that no solvent is used in the esterification reaction of polyalkyleneglycol with a closed end shown by Formula 1 which has been refined such that the concentration of residual acid (converted to acetic acid) is less than 0.03 weight % and unsaturated carboxylic acid shown by Formula 2. As an important result of this, there is no need to collect any solvent after the esterification reaction is completed. Moreover, the method of this invention is capable of producing polyetherester monomer of a high quality shown by Formula 3. As will be described in detail below, polyetherester monomer with high esterification reaction rate can be obtained without abnormal increase in viscosity or generation of gel at the time of the esterification reaction. Water-soluble vinyl copolymers using high-quality polyetherester monomer produced by a method of this invention as an intermediate product exhibit desirable characteristics as cement dispersant. They can provide fluidity to hydraulic cement compositions with only a small slump loss and hardened products obtained from such hydraulic cement compositions have improved compressive strength.

The invention is described next by way of the following four ((1)–(4)) examples of method for producing polyetheresters embodying the invention.

(1) Method of obtaining polyetherester monomer (P-1) by mixing 2.0 moles of propoxypolyethyleneglycol (with repetition number of oxyethylene units equal to 12, hereinafter written as n=12) with 0.035 weight % of residual free acid (converted to acetic acid) and 6 g of aluminum oxide-magnesium oxide-containing adsorbent for 1 hour under a heated condition at 110° C., using a filter aid to filter the mixture with pressure after it is cooled to 80° C. and obtaining refined propoxypolyetheylglycol (n=12) with 0.002 weight % of residual free acid (converted to acetic acid) as the filtrate. Next, 1.0 mole of this propoxypolyethyleneglycol (n=12) and 2.0 moles of methacrylic acid are caused to undergo an esterification reaction in the presence of p-benzoquinone in an amount of 0.19 weight % of the propoxypolyethyleneglycol (n=12) at temperature of 125–130° C. and pressure of 12–2.5 kPa by using sulfuric acid as catalyst in an amount of 0.23 weight % with respect to the total of the propoxypolyethyleneglycol (n=12) and methacrylic acid while generated water is distilled away, and the excess portion of methacrylic acid is thereafter distilled away.

(2) Method of obtaining polyetherester monomer (P-2) by mixing 2.0 moles of methoxypolyethyleneglycol (n=9) with 0.038 weight % of residual free acid (converted to acetic acid) and 6 g of aluminum oxide-magnesium oxide-containing adsorbent for 1 hour under a heated condition at 110° C., using a filter aid to filter the mixture with pressure after it is cooled to 80° C. and obtaining refined methoxypolyetheylglycol (n=9) with 0.003 weight % of residual free acid (converted to acetic acid) as the filtrate. Next, 1.0 mole of this methoxypolyethyleneglycol (n=9) and 3.5 moles of methacrylic acid are caused to undergo an esterification reaction in the presence of p-benzoquinone in an amount of 0.16 weight % of the methoxypolyethyleneglycol (n=9) at temperature of 125–130° C. and pressure of 10–2.5 kPa by using sulfuric acid as catalyst in an amount of 0.50 weight % with respect to the total of the methoxypolyethyleneglycol (n=9) and methacrylic acid while generated water is distilled away, and the excess portion of methacrylic acid is thereafter distilled away.

(3) Method of obtaining polyetherester monomer (P-3) by mixing 2.0 moles of methoxypolyethyleneglycol (n=23) with 0.033 weight % of residual free acid (converted to acetic acid) and 8 g of aluminum oxide-magnesium oxide-containing adsorbent for 1 hour under a heated condition at 110° C., using a filter aid to filter the mixture with pressure after it is cooled to 80° C. and obtaining refined methoxypolyetheylglycol (n=23) with 0.003 weight % of residual free acid (converted to acetic acid) as the filtrate. Next, 1.0 mole of this methoxypolyethyleneglycol (n=23) and 3.6 moles of methacrylic acid are caused to undergo an esterification reaction in the presence of p-benzoquinone in an amount of 0.14 weight % of the methoxypolyethyleneglycol (n=23) at temperature of 125–130° C. and pressure of 7–2.5 kPa by using sulfuric acid as catalyst in an amount of 0.32 weight % with respect to the total of the methoxypolyethyleneglycol (n=23) and methacrylic acid while generated water is distilled away, and the excess portion of methacrylic acid is thereafter distilled away.

(4) Method of obtaining polyetherester monomer (P-4) by mixing 2.0 moles of methoxypolyethyleneglycol (n=75) with 0.040 weight % of residual free acid (converted to acetic acid) and 8 g of aluminum oxide-magnesium oxide-containing adsorbent for 1 hour under a heated condition at 110° C., using a filter aid to filter the mixture with pressure after it is cooled to 80° C. and obtaining refined methoxypolyetheylglycol (n=75) with 0.003 weight % of residual free acid (converted to acetic acid) as the filtrate. Next, 1.0 mole of this methoxypolyethyleneglycol (n=75) and 3.0 moles of methacrylic acid are caused to undergo an esterification reaction in the presence of p-benzoquinone in an amount of 0.16 weight % of the methoxypolyethyleneglycol (n=75) at temperature of 125–130° C. and pressure of 1.0–2.5 kPa by using a mixture of sulfuric acid and p-toluene sulfonic acid (with weight ratio of 5/2) as catalyst in an amount of 0.28 weight % with respect to the total of the methoxypolyethyleneglycol (n=75) and methacrylic acid while generated water is distilled away, and the excess portion of methacrylic acid is thereafter distilled away.

Next, the invention is described by way of the following eight ((5)–(12)) examples of cement dispersant embodying the invention:

(5) Cement dispersant comprising water-soluble vinyl copolymer (D-1) with average numerical molecular weight of 13000 obtained by radical copolymerization of aforementioned polyetherester monomer (P-1) and methacrylic acid at the ratio of 35/65 (in molar %) in an aqueous solution.

(6) Cement dispersant comprising water-soluble vinyl copolymer (D-2) with average numerical molecular weight of 9200 obtained by radical copolymerization of aforementioned polyetherester monomer (P-1), sodium methacrylate and sodium methallyl sulfonate at the ratio of 33/61/6 (in molar %) in an aqueous solution.

(7) Cement dispersant comprising water-soluble vinyl copolymer (D-3) with average numerical molecular weight of 16000 obtained by radical copolymerization of aforementioned polyetherester monomer (P-2) and methacrylic acid at the ratio of 35/65 (in molar %) in an aqueous solution.

(8) Cement dispersant comprising water-soluble vinyl copolymer (D-4) with average numerical molecular weight of 9800 obtained by radical copolymerization of aforementioned polyetherester monomer (P-2), sodium methacrylate and sodium methallyl sulfonate at the ratio of 33/61/6 (in molar %) in an aqueous solution.

(9) Cement dispersant comprising water-soluble vinyl copolymer (D-5) with average numerical molecular weight of 21000 obtained by radical copolymerization of aforementioned polyetherester monomer (P-3) and methacrylic acid at the ratio of 35/65 (in molar %) in an aqueous solution.

(10) Cement dispersant comprising water-soluble vinyl copolymer (D-6) with average numerical molecular weight of 13500 obtained by radical copolymerization of aforementioned polyetherester monomer (P-3), sodium methacrylate and sodium methallyl sulfonate at the ratio of 33/61/6 (in molar %) in an aqueous solution.

(11) Cement dispersant comprising water-soluble vinyl copolymer (D-7) with average numerical molecular weight of 32000 obtained by radical copolymerization of aforementioned polyetherester monomer (P-4) and methacrylic acid at the ratio of 35/65 (in molar %) in an aqueous solution.

(12) Cement dispersant comprising water-soluble vinyl copolymer (D-8) with average numerical molecular weight of 18500 obtained by radical copolymerization of aforementioned polyetherester monomer (P-4), sodium methacrylate and sodium methallyl sulfonate at the ratio of 33/61/6 (in molar %) in an aqueous solution.

In what follows, the invention will be described by way of the results of test examples but it goes without saying that the invention is not limited to these examples. In the following, "parts" will mean "weight parts" and "%" will mean "weight %" unless specifically described to be otherwise.

Part 1 Production of Polyalkleneglycol with a Closed End

Production of Polyalkyleneglycol (M-1) with a Closed End

Propyl alcohol 120 g (2.0 moles) was placed inside an autoclave and after potassium hydroxide powder 0.6 g was added as catalyst, the interior of the autoclave was replaced sufficiently with nitrogen. Ethylene oxide 1056 g (24 moles) was pressured in with stirring while the reaction temperature was kept at 110–120° C. for carrying out a ring-opening addition reaction. After the ring-opening addition reaction, the product was aged for one hour at the same temperature. The reaction product was then moved into a flask, silicate-aluminum oxide-containing adsorbent (KYOWAAD700SL produced by Kyowa Chemical Industry Co., Ltd.) 12 g was added and they were mixed for one hour under a heated condition at 110° C. After it was cooled to 80° C., the mixture was filtered with pressure by means of a filter aid (TOPCOPERLITE by Showa Chemical Industry Co., Ltd.) 20 g to obtain refined propoxypolyethyleneglycol (n-12) with 0.003% of residual free acid. This is referred to as polyalkyleneglycol (M-1) with a closed end.

Production of Polyalkyleneglycols (M-2)–(M-6) with Closed End

Polyalkyleneglycols (M-2)–(M-6) with closed end were produced similarly. Polyalkyleneglycols (M-1)–(M-6) with closed end thus produced are shown together in Table 1.

Production of Polyalkyleneglycol (m-1) with a Closed End

Polyalkyleneglycol (M-1) with a closed end 1000 g was placed inside a polyethylene container and sealed with a space left in an upper portion of its interior and an accelerating test was carried out by keeping it at 80° C. for 30 days to produce polyalkyleneglycol (m-1) with a closed end. The concentration of residual free acid (converted to acetic acid) for polyalkyleneglycol (m-1) with a closed end was increased to 0.035%.

Production of Polyalkyleneglycols (m-2)–(m-6) with a Closed End

Polyalkyleneglycols (m-2)–(m-6) with a closed end were produced respectively from polyalkyleneglycols (M-2)–(M-6) with a closed end in the same way polyalkyleneglycol (m-1) with a closed end was produced from polyalkyleneglycol (M-1) with a closed end. Table 1 also shows the details of polyalkyleneglycols (m-1)–(m-6).

Production of Polyalkyleneglycol (MS-1) with a Closed End

Polyalkyleneglycol (m-1) with a closed end 800 g was placed in a flask, aluminum oxide-magnesium oxide-containing adsorbent (KYOWAAD300 produced by Kyowa Chemical Industry Co., Ltd.) 5 g was added and mixed together for one hour at 110° C., and after it was cooled to 80° C., the mixture was filtered under pressure by using a filter aid (TOPCOPERLITE produced by Showa Chemical Industry Co., Ltd.) 16 g to obtain as the filtrate refined polyalkyleneglycol (MS-1) with a closed end with the concentration of residual free acid (converted to acetic acid) reduced to 0.002%.

Production of polyalkyleneglycols (MS-2)–(MS-6) with a Closed End

Polyalkyleneglycols (MS-2)–(MS-6) with a closed end were produced respectively from polyalkyleneglycols (m-2)–(m-6) with a closed end in the same way polyalkyleneglycol (MS-1) with a closed end was produced from polyalkyleneglycol (m-1) with a closed end. Table 1 also shows the details of polyalkyleneglycols (MS-1)–(MS-6) with a closed end.

TABLE 1

| *1 material | Kind of monohydroxy compound used as material | Alkylene oxide in ring-opening addition reaction | | Concentration of residual free acid (converted to acetic acid)(%) |
|---|---|---|---|---|
| | | Kind | Moles(*) | |
| M-1 | Propyl alcohol | Ethylene oxide | 12 | 0.003 |
| M-2 | Methyl alcohol | Ethylene oxide | 9 | 0.004 |
| M-3 | Methyl alcohol | Ethylene oxide | 23 | 0.006 |
| M-4 | Methyl alcohol | Ethylene oxide | 75 | 0.004 |
| M-5 | Benzyl alcohol | Ethylene oxide | 90 | 0.007 |
| M-6 | Octylphenol | Ethylene oxide | 90 | 0.018 |
| | | Propylene oxide | 30 | |
| m-1 | Propyl alcohol | Ethylene oxide | 12 | 0.035 |
| m-2 | Methyl alcohol | Ethylene oxide | 9 | 0.038 |
| m-3 | Methyl alcohol | Ethylene oxide | 23 | 0.033 |
| m-4 | Methyl alcohol | Ethylene oxide | 75 | 0.040 |
| m-5 | Benzyl alcohol | Ethylene oxide | 90 | 0.042 |
| m-6 | Octylphenol | Ethylene oxide | 90 | 0.042 |
| | | Propylene oxide | 30 | |
| MS-1 | Propyl alcohol | Ethylene oxide | 12 | 0.002 |
| MS-2 | Methyl alcohol | Ethylene oxide | 9 | 0.003 |
| MS-3 | Methyl alcohol | Ethylene oxide | 23 | 0.003 |
| MS-4 | Methyl alcohol | Ethylene oxide | 75 | 0.003 |
| MS-5 | Benzyl alcohol | Ethylene oxide | 90 | 0.008 |
| MS-6 | Octylphenol | Ethylene oxide | 90 | 0.009 |
| | | Propylene oxide | 30 | |

*1 Kind of polyalkyleneglycol with a closed end
Moles(*) Number of moles of alkylene oxide per mole of monohydroxy compound in the ring-opening addition reaction :

Part 2 Production of Polyetherester Monomers

Test Example 1

Production of Polyetherester Monomer (P-1)

Polyalkyleneglycol (MS-1) with a closed end prepared in Part 1 (588 g=1.0 mole), methacrylic acid (172 g=2.0 moles), p-benzoquinone (1.1 g) and 98% concentrated sulfuric acid (hereinafter same concentrated sulfuric acid to be used) (1.8 g) were placed in a reactor. Temperature was increased gradually while stirring and pressure was lowered. While water being generated in the esterification reaction was removed out of the reacting system by distillation as azeotropic water/methacrylic acid mixture, the esterification reaction was continued for 2 hours under the condition of temperature at 125–130° C. and pressure at 12–2.5 kPa. Next, the remaining excess portion of methacrylic acid was removed by distillation by further reducing the pressure to obtain a product. This product was analyzed and identified as polyetherester monomer (P-1) with hydroxyl value 1.2, esterification reaction rate (hereinafter calculated from the hydroxyl value) 99%.

Test Examples 2–9

Production of Polyetherester Monomers (P-2)–(P-9)

Test Examples 2–9 was carried out like Test Example 1.

Comparison Examples 1–6

Production of Polyetherester Monomers (R-1)–(R-6)

Production of polyetherester monomers (R-1)–(R-6) was attempted as in Test Examples 1–6 except by using polyalkyleneglycols (m-1)–(m-6) with a closed end instead of polyalkyleneglycols (MS-1)–(MS-6) with a closed end but the esterification reaction was discontinued because a large amount of insoluble gel came to be deposited in the course of the esterification reaction.

Comparison Example 7

Production of Polyeherester Monomer (R-7)

An esterification reaction was attempted by placing polyalkyleneglycol (MS-2) with a closed end (428 g=1.0 mole) produced in Part 1, methacrylic acid (172 g=2.0 moles) and concentrated sulfuiric acid (1.4 g) and gradually raising the temperature with stirring but the esterification reaction was discontinued because a large amount of insoluble get came to be deposited in the course of the esterification reaction.

Comparison Example 8

Production of Polyetherester Monomer (R-8)

An esterification reaction was started by placing polyalkyleneglycol (MS-2) with a closed end (428 g=1.0 mole) produced in Part 1, methacrylic acid (172 g=2.0 moles), hydroquinone (0.9 g) and concentrated sulfuric acid (1.4 g) and gradually raising the temperature with stirring while reducing pressure but the reaction was discontinued because a large amount of insoluble gel came to be deposited about one hour after the start.

Comparison Example 9

Production of polyetherester Monomer (R-9)

An esterification reaction was started by placing polyalkyleneglycol (MS-2) with a closed end (428 g=1.0 mole) produced in Part 1, methacrylic acid (172 g=2.0 moles), hydroquinone monomethyl ether (0.9 g) and concentrated sulfuric acid (1.4 g) and gradually raising the temperature with stirring while reducing pressure but the reaction was discontinued because a large amount of insoluble gel came to be deposited about one hour after the start.

Comparison Example 10

Production of Polyetherester Monomer (R-10)

An esterification reaction was started by placing polyalkyleneglycol (MS-2) with a closed end (428 g=1.0 mole) produced in Part 1, methacrylic acid (172 g=2.0 moles), p-benzoquinone (0.06 g) and concentrated sulfuric acid (1.4 g) and gradually raising the temperature with stirring while reducing pressure but the reaction was discontinued because a large amount of insoluble gel came to be deposited about two hours after the start.

Comparison Example 11

Production of Polyetherester Monomer (R-11)

Polyetherester monomer (R-11) was obtained by placing polyalkyleneglycol (MS-2) with a closed end (428 g=1.0 mole) produced in Part 1, methacrylic acid (172 g=2.0 moles), p-benzoquinone (3.9 g) and concentrated sulfuric acid (1.4 g) and thereafter continuing as in Test Example 1.

Comparison Example 12

Production of Polyetherester Monomer (T-1)

Polyalkyleneglycol (MS-2) with a closed end prepared in Part 1 (1060 g=2.5 moles), methacrylic acid (430 g=5 moles), p-benzoquinone (2.2 g), concentrated sulfuric acid (3.5 g) and benzene (1000 g) as solvent were placed in a reactor, and an esterification reaction was carried out by raising the temperature with stirring while distilling away generated water. A product was obtained by removing the excess portion of methacrylic acid and benzene used as solvent by bubbling nitrogen after the esterification process. This product was analyzed and identified as polyetherester monomer (T-1) with hydroxyl value 1.3 and esterification reaction rate 99%.

Details of polyetherester monomers (P-1)–(P-6), (R-1)–(R-11) and (T-1) thus produced are shown in Tables 2A, 2B and 3.

TABLE 2A

| TE | PEEM | PE | $R^2$ | $R^3$ | UA | PE/UA | PI | Catalyst | T (° C.) | P (kPa) |
|---|---|---|---|---|---|---|---|---|---|---|
| 1 | P-1/A-1 | MS-1/0.002 | H | S-1 | 1/2.0 | I-1/0.19 | C-1/0.23 | 125-130 | 12-2.5 |
| 2 | P-2/A-2 | MS-2/0.003 | H | S-1 | 1/3.5 | I-1/0.16 | C-1/0.50 | 125-130 | 10-2.5 |
| 3 | P-3/A-3 | MS-3/0.003 | H | S-1 | 1/3.6 | I-1/0.14 | C-1/0.32 | 125-130 | 7-2.5 |
| 4 | P-4/A-4 | MS-4/0.003 | H | S-1 | 1/3.0 | I-1/0.16 | C-2/0.28 | 125-130 | 10-2.5 |
| 5 | P-5/A-5 | MS-5/0.008 | H | S-1 | 1/3.5 | I-1/0.12 | C-1/0.65 | 125-130 | 5-2.5 |
| 6 | P-6/A-6 | MS-6/0.009 | H | S-1 | 1/5.0 | I-1/0.15 | C-2/0.80 | 125-130 | 5-2.5 |
| 7 | P-7/A-1 | MS-1/0.002 | H | S-1 | 1/2.0 | I-2/0.28 | C-2/0.28 | 125-130 | 12-2.5 |
| 8 | P-8/A-1 | MS-2/0.003 | H | S-1 | 1/3.5 | I-2/0.09 | C-3/0.50 | 125-130 | 10-2.0 |
| 9 | P-9/A-1 | MS-3/0.003 | H | S-1 | 1/3.6 | I-3/0.16 | C-2/0.15 | 125-130 | 7-2.5 |

TABLE 2B

| CE | PEEM | PE | R² | R³ | UA | PE/UA | PI | Catalyst | T (° C.) | P (kPa) |
|----|------|-----|----|----|-----|-------|-----|----------|---------|---------|
| 1  | R-1/A-1  | m-1/0.035  | H | S-1 | 1/2.0 | I-1/0.19  | C-1/0.23 | *1 | *1 |
| 2  | R-2/A-2  | m-2/0.038  | H | S-1 | 1/2.0 | I-1/0.19  | C-1/0.23 | *1 | *1 |
| 3  | R-3/A-3  | m-3/0.033  | H | S-1 | 1/3.5 | I-1/0.16  | C-1/0.50 | *1 | *1 |
| 4  | R-4/A-4  | m-4/0.040  | H | S-1 | 1/3.6 | I-1/0.14  | C-1/0.32 | *1 | *1 |
| 5  | R-5/A-5  | m-5/0.042  | H | S-1 | 1/3.5 | I-1/0.12  | C-1/0.65 | *1 | *1 |
| 6  | R-6/A-6  | m-6/0.042  | H | S-1 | 1/5.0 | I-1/0.15  | C-1/0.80 | *1 | *1 |
| 7  | R-7/A-2  | MS-2/0.003 | H | S-1 | 1/2.0 |           | C-1/0.23 | *1 | *1 |
| 8  | R-8/A-2  | MS-2/0.003 | H | S-1 | 1/2.0 | i-1/0.21  | C-1/0.23 | *1 | *1 |
| 9  | R-9/A-2  | MS-2/0.003 | H | S-1 | 1/2.0 | i-2/0.21  | C-1/0.23 | *1 | *1 |
| 10 | R-10/A-2 | MS-2/0.003 | H | S-1 | 1/2.0 | I-1/0.014 | C-1/0.23 | *1 | *1 |
| 11 | R-11/A-2 | MS-2/0.003 | H | S-1 | 1/2.0 | I-1/0.91  | C-1/0.23 | 125-130 | 12-2.5 |
| 12 | T-1/A-2  | MS-2/0.003 | H | S-1 | 1/2.0 | I-1/0.19  | C-1/0.23 |    |    |

In Tables 2A and 2B:
TE: Test Examples;
CE: Comparison Examples;
PEEM: Polyetherester monomers shown by Formula 3 (kind/A);
PE: Polyalkyleneglycol with a closed end shown by Formula 1 (kind/free acid (%)) where free acid (%) is concentration of residual free acid converted to acetic acid;
UA: Unsaturated carboxylic acid shown by Formula 2;
PE/UA: In molar ratio;
PI: Polymerization inibitor (kind/proportion (%)) where proportion (%) is the proportion used with respect to the polyalkyleneglycol with a closed end;
Catalyst: Acid catalyst (kind/proportion (%)) where proportion (%) is the proportion used with respect to the total amount of polyalkyleneglycol with a closed end and unsaturated carboxylic acid;
A-1: Residual group obtained by removing all hydroxyl groups from polyethyleneglycol with repetition number of oxyethylene groups equal to 12;
A-2: Residual group obtained by removing all hydroxyl groups from polyethyleneglycol with repetition number of oxyethylene groups equal to 9;
A-3: Residual group obtained by removing all hydroxyl groups from polyethyleneglycol with repetition number of oxyethylene groups equal to 23;
A-4: Residual group obtained by removing all hydroxyl groups from polyethyleneglycol with repetition number of oxyethylene groups equal to 75;
A-5: Residual group obtained by removing all hydroxyl groups from polyethyleneglycol with repetition number of oxyethylene groups equal to 90;
A-6: Residual group obtained by removing all hydroxyl groups from polyethylenepolypropyleneglycol with repetition number of oxyethylene groups equal to 90 and repetition number of oxypropylene units equal to 30;
S-1: Methyl group;
I-1: p-benzoquinone;
I-2: phenothiazine;
I-3: Mixture of p-benizoquinone/phenothiazine = 50/50 as weight ratio;
i-1: Hydroquinone;
i-2: Hydroquinone monomethyl ether;
C-1: 98% concentrated sulfuric acid;
C-2: Mixed acid with 98% concentrated sulfuric acid and p-toluene sulfonic acid at weight ratio of 5.5/2.5;
C-3: Mixed acid with 98% concentrated sulfuric acid and p-toluene sulfonic acid at weight ratio of 4.5/2.5.
*1: Stopped in the middle of the reaction.

TABLE 3

| Examples | Abnormal Viscosity Increase | Generation of Gel | Esterification Reaction Ratio (%) |
|----------|-----------------------------|-------------------|-----------------------------------|
| Test Examples | | | |
| 1  | A | A | 99 |
| 2  | A | A | 99 |
| 3  | A | A | 99 |
| 4  | A | A | 99 |
| 5  | A | A | 98 |
| 6  | A | A | 95 |
| 7  | A | A | 98 |
| 8  | A | A | 98 |
| 9  | A | A | 98 |
| Comparison Examples | | | |
| 1  | B | B | *2 |
| 2  | B | B | *2 |
| 3  | B | B | *2 |
| 4  | B | B | *2 |
| 5  | B | B | *2 |
| 6  | B | B | *2 |
| 7  | B | B | *2 |
| 8  | B | B | *2 |
| 9  | B | B | *2 |
| 10 | B | B | *2 |
| 11 | A | A | 98 |
| 12 | A | A | 99 |

In Table 3:
For the evaluation of presence/absence of abnormal viscosity increase:
A: No abnormal viscosity increase during esterification reaction
B: Presence of abnormal viscosity increase during esterification reaction
For the evaluation of presence/absence of gel generation:
A: No generation of insoluble gel during esterification reaction
B: Presence of generation of insoluble gel during esterification reaction
*2: Esterification reaction ratio not measurable because esterification reaction was discontinued due to abnormal viscosity increase or generation of insoluble gel Part 3 Production of Water-soluble Vinyl Copolymers as Cement Dispersants

Test Example 10

Production of Water-soluble Vinyl Copolymer (D-1)

Polyetherester monomer (P-1) obtained in Part 2 (200 g=0.306 moles), methacrylic acid (56 g=0.65 1 moles), 3-mercaptopropionic acid (2.1 g) and water (330 g) were placed in a reactor together and the atmosphere was replaced with nitrogen after they were dissolved uniformly by stirring. While the temperature of the reacting system was maintained at 80° C. in the nitrogen environment by means of a warm bath, polymerization was started by adding 20% aqueous solution of sodium persulfate (8 g). The polymerization reaction was continued for 5 hours and an aqueous solution of water-soluble vinyl copolymer was obtained. This water-soluble vinyl copolymer was analyzed and identified as water-soluble vinyl copolymer (D-1) with average numerical molecular weight of 13000 having 35 molar % of component unit derived from polyetherester monomer (P-1) and 65 molar % of component unit derived from methacrylic acid.

Test Example 11

Production of Water-soluble Vinyl Copolymer (D-2)

Polyetherester monomer (P-1) obtained in Part 2 (200 g=0.306 moles), methacrylic acid (55 g=0.64 moles), sodium methallylsulfonate (13 g=0.082 moles), water (330 g) and 30% aqueous solution of sodium hydroxide (80 g) were added together and the atmosphere was replaced with nitrogen after they were dissolved uniformly by stirring. While the temperature of the reacting system was maintained at 60° C. in the nitrogen environment by means of a warm bath, polymerization was started by dropping 20% aqueous solution of sodium persulfate (10 g). The polymerization reaction was continued for 6 hours and 30% aqueous solution of sodium hydroxide (8 g) was added thereafter for a complete neutralization to obtain an aqueous solution of water-soluble vinyl copolymer. This water-soluble vinyl copolymer was analyzed and identified as water-soluble vinyl copolymer (D-2) with average numerical molecular weight of 9200 having 33 molar % of component unit derived from polyetherester monomer (P-1), 61 molar % of component unit derived from methacrylic acid and 6 molar % of component unit derived from sodium methallylsulfonate.

Test Examples 12–23

Production of Water-soluble Vinyl Copolymers (D-3)–(D-14)

Water-soluble vinyl copolymers (D-3)–(D-14) were produced as in Test Example 10 and 11.

Details of water-soluble vinyl copolymers (D-1)–(D-14) thus produced are shown in Table 4.

TABLE 4

| Test Examples | Water-Soluble Vinyl Copolymer | Ratio of Copolymerization (molar %) | | | | Average Numerical Molecular Weight |
|---|---|---|---|---|---|---|
| | | a | b | c | d | |
| 10 | D-1  | P-1/35 | 65 | — | — | 13000 |
| 11 | D-2  | P-1/33 | — | 61 | 6 | 9200  |
| 12 | D-3  | P-2/35 | 65 | — | — | 16000 |
| 13 | D-4  | P-2/33 | — | 61 | 6 | 9800  |
| 14 | D-5  | P-3/35 | 65 | — | — | 21000 |
| 15 | D-6  | P-3/33 | — | 61 | 6 | 13500 |
| 16 | D-7  | P-4/35 | 65 | — | — | 32000 |
| 17 | D-8  | P-4/33 | — | 61 | 6 | 18500 |
| 18 | D-9  | P-5/35 | 65 | — | — | 38000 |
| 19 | D-10 | P-5/33 | — | 61 | 6 | 23000 |
| 20 | D-11 | P-6/35 | 65 | — | — | 18400 |
| 21 | D-12 | P-6/33 | — | 61 | 6 | 11000 |
| 22 | D-13 | P-7/35 | 65 | — | — | 23500 |
| 23 | D-14 | P-7/33 | — | 61 | 6 | 13500 |

In Table 4:
a: Polyetherester monomer/molar %
b: Methacrylic acid
c: Sodium methacrylate
d: Sodium methallyl sulfonate

Comparison Example 13

Production of Water-soluble Vinyl Copolymer (DR-1)

Water-soluble vinyl copolymer (DR-1) was produced as Comparison Example 13 same way as described in Test Example 10 for the production of water-soluble copolymer (D-1) except that polyetherester monomer (P-1) 200 g was replaced by therester monomer (R-11) 200 g, obtained in Part 2.

Comparison Example 14

Production of Water-soluble Vinyl Copolymer (DT-1)

Water-soluble vinyl copolymer (DT-1) was produced as Comparison Example 14 in the same way as described in Test Example 10 for the production of water-soluble vinyl copolymer (D-1) except that polyetherester monomer (P-1) 200 parts was replaced by polyetherester monomer (T-1) 200 g obtained in Part 1.

Comparison Example 15

Production of Water-soluble Vinyl Copolymer (DT-2)

Water-soluble vinyl copolymer (DT-2) was produced as Comparison Example 15 in the same way as described in Test Example 11 for the production of water-soluble vinyl copolymer (D-2) except that polyetherester monomer (P-1) 200 g was replaced by polyetherester monomer (T-1) 200 g obtained in Part 1.

Part 3: Preparation and Evaluation of Concrete
Preparation of Concrete Samples

Concrete samples were prepared as follows under the conditions shown in Table 5. Normal portland cement (specific weight=3.16; braine value=3300), fine aggregates (Ooi-gawa River sand with specific weight=2.63) and coarse aggregates (crushed stones from Okazaki with specific weight=2.63) were sequentially added into a pan-type forced kneading mixer with capacity 50 liters and subjected to a free kneading process for 15 seconds. Next, the water-soluble vinyl copolymers produced in Part 2 as cement dispersants were each added with water and kneaded at a rate of 0.1–1.5 weight % with respect to the cement (as converted to solid component) such that the target slump would be within the range of 21±1 cm, and the mixture was kneaded for 2 minutes. An agent for controlling the amount of air was also added in each case such that the target amount of air would be 4.0–5.0%.

TABLE 5

| Water/<br>cement<br>ratio (%) | Ratio of<br>fine<br>aggregates<br>(%) | Unit amount (kg/m³) | | | |
|---|---|---|---|---|---|
| | | Water | Cement | Fine<br>aggregates | Coarse<br>aggregates |
| 50 | 49 | 165 | 330 | 867 | 960 |

Evaluation of Concrete Samples

Slump of each concrete sample prepared was evaluated as follows, both immediately after the kneading (t=0) and after it was left quietly for 60 minutes (t=60) according to JIS-A1101 (Japanese Industrial Standard). The results of evaluation are shown in Table 6.

TABLE 6

| | Cement Dispersant | | t = 0 | | t = 60 | | Slump | CS (N/mm²) | |
|---|---|---|---|---|---|---|---|---|---|
| No. | Type | Amount<br>(part) | Slump<br>(cm) | Air<br>(%) | Slump<br>(cm) | Air<br>(%) | Loss<br>(%) | 7 days | 28 days |
| 1 | D-1 | 0.23 | 21.5 | 4.5 | 18.3 | 4.3 | 85.1 | 34.2 | 45.0 |
| 2 | D-2 | 0.22 | 21.8 | 4.3 | 19.9 | 4.4 | 91.3 | 34.5 | 45.3 |
| 3 | D-3 | 0.21 | 21.3 | 4.5 | 18.5 | 4.3 | 86.4 | 34.7 | 45.9 |
| 4 | D-4 | 0.22 | 21.4 | 4.4 | 20.1 | 4.4 | 94.3 | 34.0 | 45.2 |
| 5 | D-5 | 0.23 | 21.6 | 4.5 | 18.5 | 4.2 | 85.6 | 34.3 | 45.4 |
| 6 | D-6 | 0.21 | 21.4 | 4.5 | 18.9 | 4.1 | 88.3 | 34.8 | 45.3 |
| 7 | D-7 | 0.23 | 21.7 | 4.5 | 18.4 | 4.3 | 84.8 | 34.5 | 45.7 |
| 8 | D-8 | 0.24 | 21.4 | 4.4 | 19.2 | 4.2 | 89.7 | 34.7 | 45.8 |
| 9 | D-9 | 0.23 | 21.4 | 4.5 | 19.0 | 4.3 | 88.8 | 34.7 | 45.6 |
| 10 | D-10 | 0.22 | 21.2 | 4.3 | 20.0 | 4.4 | 94.3 | 34.8 | 45.8 |
| 11 | D-11 | 0.24 | 21.5 | 4.4 | 18.5 | 4.1 | 86.0 | 34.5 | 45.3 |
| 12 | D-12 | 0.23 | 21.4 | 4.5 | 19.4 | 4.3 | 90.7 | 34.6 | 45.8 |
| 13 | D-13 | 0.23 | 21.5 | 4.5 | 19.6 | 4.1 | 91.1 | 34.5 | 45.8 |
| 14 | D-14 | 0.24 | 21.2 | 4.3 | 20.1 | 4.1 | 94.8 | 34.1 | 45.2 |
| 15 | DR-1 | 0.44 | 21.2 | 4.5 | 14.1 | 4.2 | 56.3 | 30.2 | 41.3 |
| 16 | DT-1 | 0.23 | 21.4 | 4.5 | 18.0 | 4.2 | 84.8 | 34.1 | 45.2 |
| 17 | DT-2 | 0.24 | 21.3 | 4.3 | 19.5 | 4.1 | 93.2 | 34.4 | 45.7 |

Slump loss: ((Slump at t=60)/(Slump at t=0))×100

Amount of air: Measured according to JIS-A1128

Compressive Strength (CS): Measured according to JIS-A1108.

"7 days" and "28 days": Age of tested product

Amount of added cement dispersant is shown as that of water-soluble vinyl copolymer in solid form with respect to 100 parts of cement.

As can be understood from the above, the present invention makes it possible to produce polyetherester monomers of a high quality in the absence of any solvent and to provide cement dispersants with improved properties comprising water-soluble vinyl copolymers which can be produced from such polyetherester monomers are an intermediate product.

What is claimed is:

1. A method of producing polyetherester monomer shown by Formula 3, said method comprising the step of causing an esterification reaction of polyalkyleneglycol with a closed end shown by Formula 1 which has been refined so as to contain residual free acid by less than 0.03 weight %, as converted to acetic acid, and unsaturated carboxylic acid shown by Formula 2 by using an acid catalyst under a heated and reduced-pressure condition in the absence of solvents and in the presence of one or both selected from the group consisting of p-benzoquinone and phenothiazine in an amount of 0.03–0.5 weight % of said polyalkyleneglycol with a closed end while distilling away generated water, wherein said Formula 1, said Formula 2 and said Formula 3 are respectively:

(Formula 1)

(Formula 2)

-continued

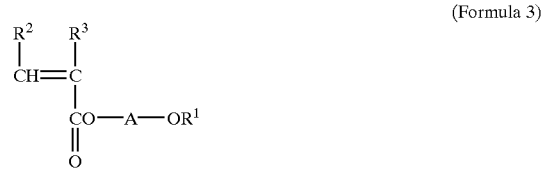

(Formula 3)

where $R^1$ is alkyl group with 1–22 carbon atoms, benzyl group, phenyl group or alkylphenyl group having alkyl group with 1–12 carbon atoms, $R^2$ and $R^3$ are each H or methyl group, and A is residual group obtained by removing all hydroxyl groups from polyalkyleneglycol of which the repetition number of oxyalkylene units is 5–250, said oxyalkylene units being selected from the group consisting of oxyethylene units and both oxyethylene units and oxypropylene units.

2. The method of claim 1 wherein said polyalkyleneglycol with a closed end is refined so as to contain residual free acid by less than 0.015 weight % as converted to acetic acid.

3. The method of claim 2 wherein said polyalkyleneglycol with a closed end is refined by using an adsorbent containing one or both selected from the group consisting of aluminum oxide and magnesium oxide.

4. The method of claim 3 wherein said polyalkylenglycol with a closed end and said unsaturated carboxylic acid are used at molar ratio of 1/1.5–1/7 in said esterification reaction and said method farther comprises the step of thereafter distilling away an excess portion of said unsaturated carboxylic acid.

5. The method of claim 4 wherein p-benzoquinone in an amount of 0.1–0.25 weight % of said polyalkyleneglycol with a closed end is further caused to be present in said esterification reaction.

6. The method of claim 4 wherein said esterification reaction is carried out while temperature is raised within a temperature range of 105–135° C. and pressure is reduced within a pressure range of 15–0.5 kPa.

7. The method of claim 5 wherein said esterification reaction is carried out while temperature is raised within a temperature range of 105–135° C. and pressure is reduced within a pressure range of 15–0.5 kPa.

8. The method of claim 6 wherein an acid catalyst is used in said esterification reaction in an amount of 0.2–1.5 weight % of total amount of said polyalkyleneglycol with a closed end and said unsaturated carboxylic acid.

9. The method of claim 7 wherein an acid catalyst is used in said esterification reaction in an amount of 0.2–1.5 weight % of total amount of said polyalkyleneglycol with a closed end and said unsaturated carboxylic acid.

10. The method of claim 8 wherein A in Formula 1 consists only of oxyethylene units.

11. The method of claim 9 wherein A in Formula 1 consists only of oxyethylene units.

12. A cement dispersant comprising water-soluble vinyl copolymers obtained by a first process and a second process wherein said first process is a process of producing polyetherester monomers shown by Formula 3 in an esterification reaction of polyalkyleneglycol with a closed end shown by Formula 1 which has been refined so as to contain residual free acid by less than 0.03 weight %, as converted to acetic acid, and unsaturated carboxylic acid shown by Formula 2 by using an acid catalyst under a heated and reduced-pressure condition in the absence of solvents and in the presence of one or both selected from the group consisting of p-benzoquinone and phenothiazine in an amount of 0.03–0.5 weight % of said polyalkyleneglycol with a closed end while distilling away generated water, wherein said second process is a process of producing said water-soluble vinyl copolymers by a radical copolymerization reaction of said polyetherester monomers obtained in said first process and vinyl monomers which are copolymerizable therewith inside an aqueous solution, and wherein said Formula 1, said Formula 2 and said Formula 3 are respectively:

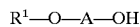  (Formula 1)

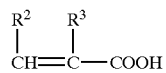  (Formula 2)

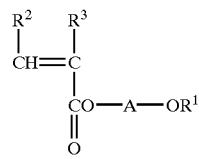  (Formula 3)

where $R^1$ is alkyl group with 1–22 carbon atoms, benzyl group, phenyl group or alkylphenyl group having alkyl group with 1–12 carbon atoms, $R^2$ and $R^3$ are each H or methyl group, and A is residual group obtained by removing all hydroxyl groups from polyalkyleneglycol of which the repetition number of oxyalkylene units is 5–250, said oxyalkylene units being selected from the group consisting of oxyethylene units and both oxyethylene units and oxypropylene units.

13. The cement dispersant of claim 12 wherein polyalkyleneglycol with a closed end which has been refined so as to contain residual free acid by less than 0.015 weight %, as converted to acetic acid, and unsaturated carboxylic acid are caused to undergo an esterification reaction in said first process.

14. The cement dispersant of claim 13 wherein said polyalkyleneglycol with a closed end, which undergoes said esterification reaction in said first process, is refined by using an adsorbent containing one or both selected from the group consisting of aluminum oxide and magnesium oxide.

15. The cement dispersant of claim 14 wherein said polyalkylenglycol with a closed end and said unsaturated carboxylic acid are used at molar ratio of 1/1.5–1/7 in said esterification reaction and an excess portion of said unsaturated carboxylic acid is thereafter distilled away in said first process.

16. The cement dispersant of claim 15 wherein p-benzoquinone in an amount of 0.1–0.25 weight % of said polyalkyleneglycol with a closed end is further caused to be present in said first process.

17. The cement dispersant of claim 15 wherein said esterification reaction is carried out in said first process while temperature is raised within a temperature range of 105–135° C. and pressure is reduced within a pressure range of 15–0.5 kPa.

18. The cement dispersant of claim 16 wherein said esterification reaction is carried out in said first process while temperature is raised within a temperature range of 105–135° C. and pressure is reduced within a pressure range of 15–0.5 kPa.

19. The cement dispersant of claim 17 wherein an acid catalyst is used in said first process in an amount of 0.2–1.5 weight % of total amount of said polyalkyleneglycol with a closed end and said unsaturated carboxylic acid.

20. The cement dispersant of claim 18 wherein an acid catalyst is used in said first process in an amount of 0.2–1.5 weight % of total amount of said polyalkyleneglycol with a closed end and said unsaturated carboxylic acid.

21. The cement dispersant of claim 19 wherein A in Formula 1 consists only of oxyethylene units.

22. The cement dispersant of claim 20 wherein A in Formula 1 consists only of oxyethylene units.

23. The cement dispersant of claim 21 wherein the vinyl monomers used in said second process are selected from the group consisting of (meth)acrylic acid and salts thereof.

24. The cement dispersant of claim 22 wherein the vinyl monomers used in said second process are selected from the group consisting of (meth)acrylic acid and salts thereof.

25. The cement dispersant of claim 21 wherein the vinyl monomers used in said second process are selected from the group consisting of (meth)acrylic acid, salts thereof and methallyl sulfonic acid salt.

26. The cement dispersant of claim 22 wherein the vinyl monomers used in said second process are selected from the group consisting of (meth)acrylic acid, salts thereof and methallyl sulfonic acid salt.

* * * * *